J. D. MAXWELL.
TIRE FASTENER.
APPLICATION FILED JULY 2, 1906.
905,204.
Patented Dec. 1, 1908.
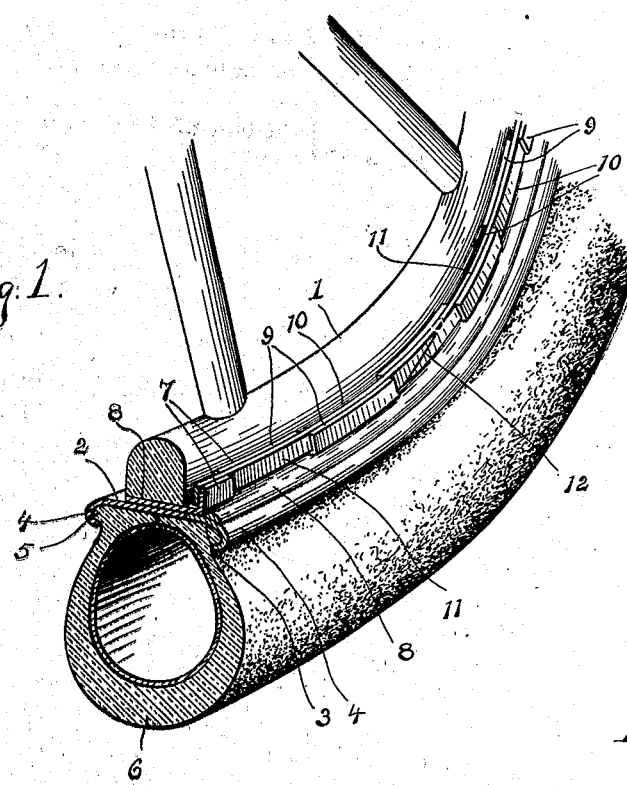
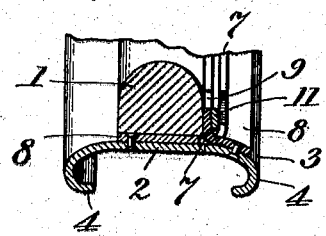
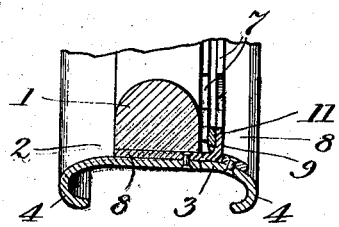
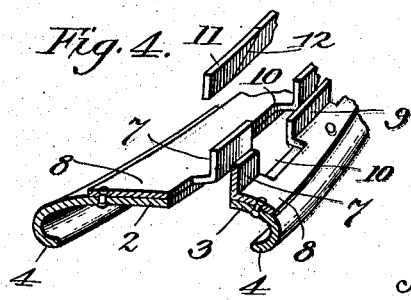
WITNESSES:
Chas. B. Shumway
Thos. B. Longstaff
Jonathan D. Maxwell
INVENTOR.
BY 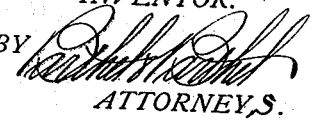
ATTORNEYS.

UNITED STATES PATENT OFFICE.

JONATHAN D. MAXWELL, OF TARRYTOWN, NEW YORK.

TIRE-FASTENER.

No. 905,204.　　　　Specification of Letters Patent.　　　Patented Dec. 1, 1908.

Application filed July 2, 1906. Serial No. 324,382.

*To all whom it may concern:*

Be it known that I, JONATHAN D. MAXWELL, a citizen of the United States of America, residing at Tarrytown, in the county of Westchester and State of New York, have invented certain new and useful Improvements in Tire-Fasteners, of which the following is a specification, reference being had therein to the accompanying drawings.

This invention relates to improved means for detachably securing pneumatic and other rubber tires to wheel rims, and the object of the invention is to provide a simple, cheap and efficient fastening which will securely hold the tire without bolts or other devices passing through the tire or embedded therein and which may be quickly and easily manipulated to detach or secure the tire in place.

To this end the invention consists in providing a two part band or ring one part of which is secured permanently to the rim and the other part detachably attached to the edge of said part at one side of the rim so that it may be quickly released and taken away laterally, leaving the tire free, said tire being held by an inwardly turned flange on the outer edge of each part embracing outwardly extending ribs on the base of the tire.

The invention also consists in providing interlocking means for securing the two parts of the band together without bolts or similar parts, and to provide certain other new and useful features, all as hereinafter more fully described reference being had to the accompanying drawings, in which Figure 1 is a sectional perspective view of a part of a wheel with a tire secured thereto by a device embodying the invention; Figs. 2 and 3 are transverse sections through the wheel rim and tire fastening; Fig. 4, is a sectional perspective view of the parts of the fastening detached and separated.

As shown in the drawings 1 represents the ordinary wooden rim of a vehicle wheel to the periphery of which is permanently secured by bolts or otherwise, the sheet-metal ring 2 forming the fixed member of a longitudinally divided securing band which is formed of said ring and a detachable ring 3, each of which rings is formed with an outwardly extending inwardly turned flange 4 at its outer edge to engage and hook over corresponding laterally extending ribs 5 on the base of the tire casing 6. The fixed ring extends across the face of the rim, forming a seat for the tire, and projects laterally from one edge of the rim to engage one of the securing ribs on the tire, the other ring forming the opposite projecting edge of the securing band and being detachably attached to ring 2 by providing each with an inwardly extending interrupted flange 7 adjacent to the edge of the wheel rim. These flanges 7 may be formed from an integral part of the rings or as shown in the drawings may be formed by securing, by riveting or otherwise, a strip 8 to the inner surface of each ring and bending the edges of the strips up to form the flanges. The projecting portions or lugs 9 of the interrupted flange on one ring are adapted to fit into the notches 10 in the other ring and said notches are of such a depth that the lugs on the opposite ring enter said notches and pass beyond the line of the lugs on that ring, so that by inserting a flat metal ring or strip 11 between the two rows of lugs, the rings are securely locked together. The securing ring 11 is severed at 12 by cutting the same slantingly across to form overlapping ends, and to remove the ring from between the lugs in detaching the tire, the free end of said ring is sprung inward.

In this construction the tire is firmly held without the use of bolts or rods passing through the tire, neither are such means used to detachably hold the fastener, and thus the detaching and securing of the tire are greatly facilitated, and by making the securing band or rim in two parts, one edge of said band may be entirely removed, leaving the tire perfectly free so that it may be easily slipped off laterally.

Having thus fully described the invention, what I claim is:—

1. The combination with a wheel rim, of a ring having a flange at one edge to engage and hold one edge of a tire and secured to the outer surface of the rim, a ring having a flange at one edge to engage and hold the opposite edge of the tire, inwardly extending interrupted flanges on the adjacent edges of said rings adapted to interlock, and a severed ring to engage and hold said flanges in their locked position.

2. The combination with a wheel rim, of a ring having a flange at one edge to engage and hold an edge of a tire and secured to said rim, a ring having a flange at one edge to engage and hold the other edge of the tire, inwardly extending interrupted flanges on the adjacent edges of said rings, the projecting portions of one ring being adapted to project into the space between the projections of the other ring and to pass beyond the line of said projections on said other ring, and a severed securing ring adapted to lie between the lines of projections to lock the rings together.

3. A rim for connecting a rubber tire to a wheel comprising a rim-plate having a flange provided with cut away portions, a clamping ring provided with lugs which project through the cut away portions of the flange, and a locking ring mounted between the lugs and the flange, substantially as specified.

4. A rim for connecting a rubber tire to a wheel comprising a rim-plate having an inwardly disposed flange provided with cut away portions, a clamping ring fitted against the flange of the rim plate and provided with inwardly projecting angular lugs which fit into the cut away portions of the flange and an expansible locking ring mounted between the flange and the lugs, substantially as specified.

In testimony whereof I affix my signature in presence of two witnesses.

JONATHAN D. MAXWELL.

Witnesses:
  J. T. CONNELL,
  C. P. MINOR.